US010970031B2

(12) United States Patent
McCoy et al.

(10) Patent No.: US 10,970,031 B2
(45) Date of Patent: Apr. 6, 2021

(54) SYSTEMS AND METHODS CONFIGURED TO PROVIDE GAZE-BASED AUDIO IN INTERACTIVE EXPERIENCES

(71) Applicant: Disney Enterprises, Inc., Burbank, CA (US)

(72) Inventors: Maxwell McCoy, Burbank, CA (US); Elliott Baumbach, Porter Ranch, CA (US); Timothy M. Panec, Studio City, CA (US)

(73) Assignee: Disney Enterprises, Inc., Burbank, CA (US)

( * ) Notice: Subject to any disclaimer, the term of this patent is extended or adjusted under 35 U.S.C. 154(b) by 11 days.

(21) Appl. No.: 16/141,230

(22) Filed: Sep. 25, 2018

(65) Prior Publication Data

US 2020/0097246 A1 Mar. 26, 2020

(51) Int. Cl.
*G06F 3/16* (2006.01)
*G06F 3/01* (2006.01)

(52) U.S. Cl.
CPC ............. *G06F 3/165* (2013.01); *G06F 3/011* (2013.01); *G06F 3/013* (2013.01); *G06F 3/167* (2013.01); *G06F 3/017* (2013.01)

(58) Field of Classification Search
CPC .......... G06F 3/165; G06F 3/013; G06F 3/017; G06F 3/167; G06F 3/011
See application file for complete search history.

(56) References Cited

U.S. PATENT DOCUMENTS

| | | | |
|---|---|---|---|
| 2017/0277257 A1* | 9/2017 | Ota | G06F 3/013 |
| 2017/0287215 A1* | 10/2017 | Lalonde | G02B 27/017 |
| 2017/0374486 A1* | 12/2017 | Killham | H04N 13/279 |

\* cited by examiner

*Primary Examiner* — Jonathan A Boyd
(74) *Attorney, Agent, or Firm* — Esplin & Associates, PC

(57) ABSTRACT

A system configured to provide gaze-based audio presentation for interactive experiences. The interactive experiences may take place in an interactive space. An interactive space may include one or both of augmented reality (AR) environment, a virtual reality (VR) environment, and/or other interactive spaces. The interactive space may include audio content and/or virtual content. A user's gaze may be tracked. Based on the user's gaze indicating they are looking at a given virtual object, the audio content may be modified. The modification may include one or more of increasing audio content specifically associated with given virtual object, decreasing a volume of other audio content, and/or other modifications.

20 Claims, 6 Drawing Sheets

SYSTEMS AND METHODS CONFIGURED TO PROVIDE GAZE-BASED AUDIO IN INTERACTIVE EXPERIENCES

FIELD OF THE DISCLOSURE

The present disclosure relates to systems and methods configured to provide gazed-based audio in interactive experiences.

BACKGROUND

Devices and systems are available to provide virtual reality (VR) and/or augmented reality (AR) experiences. In particular, handheld and/or wearable technology may be used. Wearable technology may include head-mounted displays (HMD). Handheld technology may include mobile computing platforms, such as smart phones and/or tablets.

SUMMARY

One aspect of the disclosure relates to a system configured to provide gaze-based audio presentation for interactive experiences. An interactive experience may take place in an interactive environment. An interactive environment may include one or both of a virtual reality environment and/or an augmented reality environment. An augmented reality environment may include views of images of virtual content superimposed over views of a real-world environment. A virtual reality environment may include views of images of virtual content within a virtual environment. Virtual content may include one or more virtual objects and/or other virtual content.

In some implementations, an interactive environment may include audio content accompanying views of the virtual content. For example, audio content may be presented such that audio may be perceived as being emitted from a given virtual object. By way of non-limiting illustration, a virtual object may be character and audio content may accompany the presentation of the character such that the character appears to be speaking. A user's gaze (including, but not limited to, a gaze direction) may be tracked during the presentation of virtual and/or audio content. Based on the gaze and/or the perceived locations of virtual content, virtual content currently occupying the user's attention may be identified and the presentation of audio may be modified. In some implementations, the modification may include one or more of enhancing audio associated with and/or accompanying the identified virtual content, diminishing the audio not associated with and/or not accompanying the identified virtual content, and/or other modifications. Enhancing audio may include increasing a volume and/or other techniques. Diminishing audio may include one or more of decreasing a volume, ceasing presentation, muffling audio, and/or other techniques. In some implementations, the audio not associated with and/or not accompanying the identified virtual content may include one or more of audio content associated with and/or accompanying other virtual content, ambient sounds within a real-world environment, and/or other audio content.

In some implementations, a system configured to provide gaze-based audio presentation may comprise one or more of non-transitory electronic storage, one or more presentation devices, one or more physical computer processors, and/or other components.

The non-transitory electronic storage may be configured to store virtual content information, audio information, and/or other information. The virtual content information may define virtual content. The virtual content may include one or more virtual objects and/or other virtual content. The one or more virtual objects may include a first virtual object and/or other virtual objects. The audio information may define audio content. The audio content may include one or more of first audio content associated with the first virtual object, second audio content, and/or other audio content.

A presentation device may be configured to be installed on a head of a user. The presentation device may be configured to generate images of the virtual content and present the images. In some implementations, the images may be presented such that the virtual content depicted in the images may be perceived by the user as being present in a real-world environment. Such presentation may create an augmented reality environment. In some implementations, the images may be presented such that the user may perceive solely the virtual content. Such presentation may create a virtual reality environment. The presentation device may be configured to present audio content.

The one or more physical computer processors may be configured by machine-readable instructions. Executing the machine-readable instructions may facilitate providing gazed-based audio presentation. The machine-readable instructions may include one or more computer program components. The one or more computer program components may include one or more of a control component, a gaze component, a modification component, and/or other components.

The control component may be configured to control the presentation device to generate images of virtual content. The virtual content may include one or more virtual object. The images may be presented such that individual virtual object may be perceived to be at individual locations. By way of non-limiting illustration, presentation device may generate and present a first image of the first virtual object such that the first virtual object may be perceived to be present at a first location. The first location may be real-world location in a real-world environment and/or a virtual location within a virtual environment.

The control component may be configured to control the presentation device to effectuate presentation of audio content. By way of non-limiting illustration, presentation device may present one or more of the first audio content, the second audio content, and/or other audio content. The presentation of the first virtual object and the first audio content may cause the user to perceive the first audio content as being emitted from the first virtual object.

The gaze component may be configured to obtain gaze information and/or other information. The gaze information may specify a gaze direction of the user and/or other information.

The modification component may be configured to modify the presentation of the audio content based on one or more of the gaze information, perceived locations of the one or more virtual objects, and/or other information. By way of non-limiting illustration, responsive to the gaze direction of the user being toward the first location, the modification component may modify the presentation of the first audio content, the second audio content, and/or other audio content.

In some implementations, modifying the presentation of the second audio content may include decreasing a volume of the second audio content and/or ceasing presentation of the second audio content.

In some implementations, modifying the first audio content may include increasing a volume of the first audio content.

In some implementations, presentation device may include one or more sensors configured to generate output signals conveying ambient audio information and/or other information. The ambient audio information may define ambient real-world sounds within a real-world environment.

The control component may be configured to, based on the ambient audio information, control the presentation device to effectuate presentation of the ambient sounds.

The modification component may be configured to modify the presentation of the ambient sounds based on one or more of the gaze information, the perceived locations of the one or more virtual objects, and/or other information. By way of non-limiting illustration, responsive to the gaze direction of the user being toward the first location, the modification component may further modify the presentation of the ambient sounds. In some implementations, modifying the presentation of the ambient sounds may include one or more of decreasing a volume of the presented ambient sounds and/or ceasing presentation of the ambient sounds.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
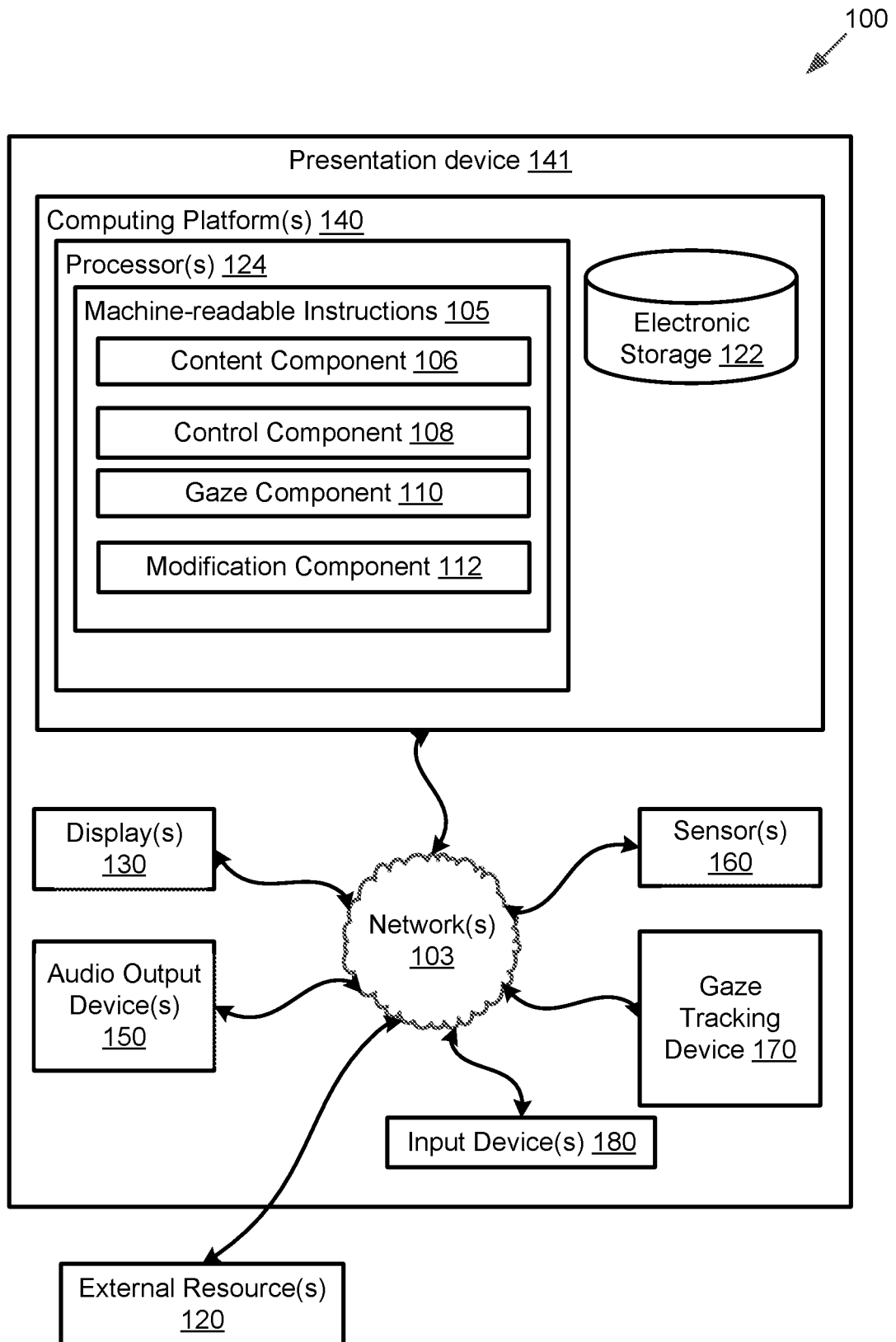
FIG. 1 illustrates a system configured to provide gaze-based audio presentation for interactive experiences, in accordance with one or more implementations.

FIG. 1 illustrates a system 100 configured to provide gaze-based audio presentation for interactive experiences. An interactive experience may include one or more of a game, a video, and/or other experiences. An interactive experience may take place in an interactive environment. An interactive environment may include one or more of augmented reality (AR) environment, a virtual reality (VR) environment, and/or other interactive spaces.

An augmented reality environment may include views of images of virtual content superimposed over views of a real-world environment. The views of the real-world environment may include views of one or more physical objects. The one or more virtual objects may be positioned throughout the topography of a real-world environment such that the one or more virtual objects may be perceived to be present at locations in the real-world environment. The virtual objects may be positioned throughout the topography of a real-world environment relative to the one or more physical objects. A virtual reality environment may include views of images of virtual content within a virtual environment. Virtual content may include one or more of virtual objects, one or more virtual worlds, and/or other virtual content. The presentation of virtual content may be accompanied by presentation of audio content.

In some implementations, perceived locations of virtual content may be dictated by the presence of one or more beacons in a real-world environment. In some implementations, individual beacons may be individual physical objects. In some implementations, individual beacons may include one or more light sources, and/or other components.

In some implementations, light source(s) of individual beacons may indicate a reference point (e.g., a location in the real-world) for the individual beacons within a real-world environment. The light source(s) may facilitate determination of a location of individual beacons in the real-world environment. Light source(s) may include one or more sources of electromagnetic radiation. In some implementations, light source(s) may include one or more light emitting diodes, and/or other light sources. The individual reference points indicated by individual beacons may dictate where virtual objects may be placed within the real-world such that one or more virtual objects may be perceived as being present at the individual reference points within the real-world.

The audio content associated with individual virtual objects and/or individual physical objects may be enhanced and/or diminished based on individual virtual objects and/or individual physical objects occupying the user's attention. By way of non-limiting illustration, a gaze direction of a user and location of virtual content may dictate that a user's attention may be toward one or more virtual objects and/or one or more physical objects. By way of non-limiting illustration, audio content of individual virtual objects and/or individual physical objects at which a user may be looking may be highlighted over other audio content.

System 100 may include one or more of one or more presentation devices, one or more input devices 180, one or more external resources 120, and/or other components. The one or more presentation devices may include presentation device 141 and/or other presentation devices. While some descriptions of features and/or functionality of presentation devices may be directed to presentation device 141, this is for illustrative purposes only. It is to be noted that other presentation devices (not shown) may be similarly configured.

Presentation device 141 may include one or more of one or more computing platforms 140, one or more displays 130, one or more audio output devices 150, one or more sensors 160, a gaze tracking device 170, and/or other components.

In some implementations, components of system 100 may be operatively linked via one or more electronic communication links. For example, such electronic communication links may be established, at least in part, via network(s) 103. The network(s) 103 may include wired and/or wireless connections. By way of non-limiting illustration, network(s) 103 may include one or more of the Internet, wireless Bluetooth Low Energy (BLE), wired Universal Serial Bus (USB) connection, and/or other connections. It will be appreciated that this is not intended to be limiting and that the scope of this disclosure includes implementations in which components of system 100 may be operatively linked via some other communication media.

In some implementations, one or more computing platforms 140 may be configured to provide local hosting of features and/or functions of machine-readable instructions 105 to presentation device 141 and/or other components. In some implementations, one or more computing platforms 140 may be included with and/or coupled to presentation device 141 and/or other components. The one or more computing platforms 140 may communicate with presentation device 141 and/or other components via local wired and/or wireless connections (e.g., USB, BLE and/or other connections), and/or other communication schemes. By way of non-limiting illustration, one or more computing platforms 140 may include one or more of a mobile computing platform (e.g., one or more of a cellular telephone, a smartphone, a laptop, a tablet computer, an AR/VR platform, and/or other computing platforms), a stationary computing platform (e.g., a desktop computer, gaming console, and/or other computing platforms), and/or other computing platforms.

The depictions in the figures are illustrative and not intended to be limited. For example, in some implementations, one or more computing platforms 140 and components of presentation device 141 may be in direct wired communication and reside inside dedicated hardware (e.g., a smartphone, an HMD and/or other hardware).

In some implementations, one or more computing platforms 140 may be configured to provide remote hosting of features and/or functions of machine-readable instructions 105 to presentation device 141 and/or other components. In some implementations, one or more computing platforms 140 may be remotely located from presentation device 141 and/or other components. The one or more computing platforms 140 may communicate with one or more of presentation device 141 and/or other components via client/server architecture, and/or other communication schemes. By way of non-limiting illustration, one or more computing platforms 140 may comprise one or more servers and/or other computing devices.

In some implementations, presentation device 141 may be configured to present images individually to each eye of a user as stereoscopic pairs. In some implementations, presentation device 141 may be arranged on, and/or may comprise part of, a headset (not shown in FIG. 1). When the headset is installed and/or mounted on a user's head, the user's gaze may be directed towards presentation device 141 (or at least a display of presentation device 141) to view images presented by presentation device 141. A headset may include one or more of a head-mounted display, goggles, glasses, and/or other devices.

Presentation device 141 may be configured to present virtual content, real-world content, and/or other content. Presentation device 141 may superimpose images of virtual content over views of the real-world such that the virtual content may be perceived by the viewing user as being present in the real world.

Presentation device 141 may present images of virtual content. The presentation device 141 may present audio content in conjunction with the images. The presentation device 141 may be configured to present the views of a real-world environment.

In some implementations, display(s) 130 may be configured to present images of virtual content, images of views of the real-world, and/or other content. Presentation of images by display(s) 130 of presentation device 141 may be facilitated by control signals communicated to display(s) 130 (see, e.g., control component 108). Display(s) 130 may include one or more of a screen, a set of screens, a touchscreen, a monitor, a headset (or portion thereof), and/or other displays.

In some implementations, display(s) 130 may include one or more of a transparent, semi-transparent, reflective, semi-reflective, and/or other display components. Images of virtual content may be presented on the display component such that the user may view the images presented on the display component as well as the real-world through the display component. Such a configuration may provide an interactive environment comprising an augmented reality (AR) environment.

In some implementations, display(s) 130 may comprise a display screen configured to present images. The user may view the display screen such that the display screen may encompass, substantially or entirely, the user's field of view without providing views of the real-world through the display screen. Such a configuration may provide an interactive space comprising a virtual reality (VR) environment.

The one or more audio output devices 150 may be configured to present audio content. By way of non-limiting illustration, one or more audio output devices 150 may comprise one or more of a speaker, headphones, earbuds, and/or other devices. In some implementations, one or more audio output devices 150 may comprise a noise-canceling device. A noise canceling device may reduce (or possibly eliminate) a user's direct reception of ambient sounds using active noise control and/or other techniques.

Individual sensors of one or more sensors 160 may be configured to generate output signals. An individual sensor may include one or more of an orientation sensor, an audio input sensor, and/or other sensors. In some implementations, an audio input sensor may be included in one or more input devices 180, described herein. An orientation sensor may be configured to generate output signals conveying orientation information and/or other information. Orientation information derived from output signals of an orientation sensor may define an orientation of presentation device 141. In some implementations, the orientation of presentation device 141 may refer to one or more of a pitch angle, a roll angle, a yaw angle, a heading, and/or other measurements. An orientation sensor may include an inertial measurement unit (IMU) such as one or more of an accelerometer, a gyroscope, a magnetometer, Inclinometers, and/or other devices.

Individual input devices of one or more input devices 180 may be configured to receive input. Input may be received from a user and/or an ambient environment. Individual input devices may be configured to receive one or more of physical input, audio input, gesture-based input, and/or other input. By way of non-limiting illustration, one or more input devices 180 may include one or more of a handheld input device, an audio input sensor, an image capture device, and/or other devices.

A handheld input device may be configured to receive physical input and/or gesture-based input. A handheld input device may include one or more physical input mechanisms, one or more virtual input mechanisms, and/or other elements. A physical input mechanism may include one or more of a button, a trigger, a joy-stick, and/or other mechanisms. A virtual input mechanism may include one or more of a virtual button (e.g., presented on a display screen), a virtual joystick (e.g., presented on a display screen), and/or other mechanisms. In some implementations, a handheld input device may include one or more motion sensors configured to generate output signals conveying gesture-based inputs. In some implementations, a handheld input device may include a controller. A controller may be in the form of one or more of a remote, a weapon, and/or other handheld devices.

An audio input sensor may be configured to receive audio input. An audio input sensor may include a sound transducer and/or other sensor configured to convert sound (e.g., air pressure variation) into an electrical signal. By way of non-limiting illustration, an audio input sensor may include a microphone. In some implementations, an audio input sensor may be configured to generate output signals conveying ambient audio information and/or other information. The ambient audio information defines ambient sounds within a real-world environment.

An image capture device may be configured to obtain and/or determine gesture-based input. An image capture device may include an image sensor configured to generate output signals conveying image information. Image information may define images of the real world. A user may perform gestures within a field of view of the image capture device. The gestures may be recognized within images defined by the image information conveyed by the output signals of the image capture device. By way of non-limiting illustration, an image capture device including an image sensor may comprise a camera.

In some implementations, individual beacons may be present in the real-world. The individual ones of the beacons may be detectable in the real world based on the image information and/or other information (e.g., via control component 108, below). By way of non-limiting illustration, color and/or pattern of light emitted by a beacon may be detectable within one or more images using one or more image processing techniques. The individual reference points in the real-world at which the beacons may be located may be determined from the image information and/or other information. By way of non-limiting illustration, location of the beacons may be determined from one or more images using one or more image processing techniques. One or more image processing techniques may include one or more of bundle adjustment, speeded up robust features (SURF), scale-invariant feature transform (SIFT), and/or other techniques.

In some implementations, one or more users may be present in the real-world. The individual ones of the users may be detectable in the real world based on image information and/or other information (see, e.g., gaze component 110 described herein). In some implementations, presence of individual users in the real-world may be determined from one or more images using one or more image processing techniques. In some implementations, identify of individual users in the real-world may be determined from one or more images using one or more image processing techniques. Identify may include one or more of a name, a username, and/or other identifying information. One or more image processing techniques may include one or more of computer vision, facial recognition, and/or other techniques.

The gaze tracking device 170 may be configured to generate output signals conveying gaze information and/or other information. Gaze information may include information related to tracking a user's gaze. Gaze information may include one or more of a gaze direction, vergence angle, vergence distance, and/or other information related to a user's vision (see, e.g., gaze component 110 shown in FIG. 1 and described herein). Gaze direction may be specified as a vector and/or by other information.

In some implementations, tracking a user's gaze may be based on the line of sight extending from individual pupils and/or other information. The gaze tracking device 170 may include one or more of a sensor, an emitter, and/or other components. The emitter may be configured to emit light. The emitter may comprise an infrared (IR) emitter configured to emit IR light. In some implementations, a sensor may comprise one or more of an IR sensor, an image sensor, and/or other sensors. A sensor may be incorporated into a camera and/or other devices. By way of non-limiting illustration, a sensor of gaze tracking device 170 may comprise an IR camera and/or other devices. In some implementations, output signals of one or more sensors of gaze tracking device 170 may convey one or more of positions of pupils of a user relative to a locus of a reflectance of light emitted by an emitter of gaze tracking device 170, and/or other information. Output signals of one or more sensors of gaze tracking device 170 may be used to determine gaze information. In some implementations, gaze tracking device 170 may include one or more image sensors configured to generate output signals conveying image information. The one or more image sensors may be directed at a user's face so that the image information may define images of the user's face and eyes. In some implementations, the line of sight extending from individual pupils and/or other information may be derived from the images via one or more image processing techniques to determine gaze information.

In some implementations, tracking a user's gaze may be based on an orientation of presentation device 141. The gaze tracking device 170 may include one or more orientation sensors. In some implementations, the orientation of presentation device 141 may refer to one or more of a pitch angle, a roll angle, a yaw angle, a heading, and/or other measurements. The gaze information may be derived from the orientation of the presentation device. By way of non-limiting illustration, the user's gaze direction may be inferred from heading of the presentation device 141. By way of non-limiting illustration, the user's gaze direction may be determined as the heading of the presentation device 141.

Computing platform(s) 140 may include one or more of one or more physical processors 124, non-transitory electronic storage 122, and/or other components. Physical processor(s) 124 may be configured by machine-readable instructions 105. Executing machine-readable instructions 105 may cause one or more physical processor(s) 124 to provide gaze-based audio presentation for interactive experiences. The machine-readable instructions 105 may include one or more computing program components. The computer program components may include one or more of a content component 106, a control component 108, a gaze component 110, a modification component 112, and/or other components.

Non-transitory electronic storage 122 may be configured to store information utilized by one or more computing platforms 140, presentation device 141, and/or other components of system 100. Non-transitory electronic storage 122 may be configured to store one or more of virtual content information, audio information, user information, and/or other information. The virtual content information may define virtual content. The virtual content may include one or more of one or more virtual objects, one or more virtual environments, and/or other content. The one or more virtual objects may include a first virtual object, a second virtual object, and/or other virtual objects. The first virtual object may be separate and distinct from the second virtual object and/or other virtual objects.

The virtual objects may include one or more of a virtual entity, virtual structure, and/or other virtual objects. The virtual objects may be positioned throughout the topography of the virtual environments and/or the real-world environment. The virtual environments may be a simulated physical space. The simulated physical space may be in a three-dimensional space, two-dimensional space, and/or other simulated physical spaces. The simulated physical space may depict an environment.

A virtual structure may include a depiction of one or more of a building, a store, a landmark, and/or other virtual structures. In some implementations, the virtual structure may be a representation of a real-world structure. In some implementations, the virtual structure may be a virtual-world structure. In some implementations, the virtual structure may include the virtual entity and/or other virtual content. For example, the virtual entity may be within and/or occupy the virtual structure. A virtual entity may comprise a character. A virtual entity may be a humanoid character, a fictional creature, and/or other entity.

The audio information may define audio content. The audio content may include first audio content associated with the first virtual object, second audio content, and/or other audio content. In some implementations, the second audio content may be associated with the second virtual object. The second audio content may be audio content other the first audio content. The second audio content may include one or more of an audio clip, soundtrack, and/or other audio content. The soundtrack may be a song, part of a song, a sound effect, and/or other content. In some implementations, the second audio content may comprise ambient sounds conveyed by ambient audio information (e.g., derived from output signals of an audio input device). In some implementations, the second audio content may be associated with the second virtual object.

The user information may include user profiles and/or other information associated with users of system 100. The user information may include information stored by individual presentation devices, information accessible to individual presentation devices from external resource(s) 120, and/or other storage locations. The user information may include, for example, information identifying users (e.g., a username or handle, a number, an identifier, and/or other identifying information), biometric information, user audio information, and/or other information related to users. In some implementations, biometric information may include one or more biometric characteristics of user. The one or more biometric characteristics may include facial characteristics. By way of non-limiting illustration, facial characteristics may be stored as an image template to facilitate user identification through template matching and/or other techniques. In some implementations, user audio information may define user-specific audio content associated with individual users. The user-specific audio content may include one or more of an audio clip, soundtrack, and/or other audio content. The soundtrack may be a song, part of a song, a sound effect, and/or other content. In some implementations, the user-specific audio content for a given user may be considered the user's theme song. Based on the gaze of one or more users being directed at a given user, the given user's user-specific audio content may be presented (see, e.g., modification component 112).

The content component 106 may be configured to obtain the virtual content information, audio information, ambient audio information, and/or other information. Content component 106 may be configured to obtain the virtual content information, audio information, ambient audio information, and/or other information from one or more of non-transitory electronic storage 122, one or more sensors 160, one or more input devices 180, external resource(s) 120, and/or other locations.

The control component 108 may be configured to control presentation device 141 to provide the user with the virtual content, audio content, ambient sounds (defined by ambient audio information), and/or other content. By way of non-limiting illustration, the control component 108 may be configured to control presentation device 141 (e.g., via display(s) 130) to generate images of virtual content and present the images such that the virtual content may be perceived as being present in a real-world environment. By way of non-limiting illustration, the control component 108 may be configured to control the presentation device 141 to generate a first image of the first virtual object such that the first virtual object may be perceived to be present at a first location in the real-world environment. In some implementations, the first location may be a location where a first beacon may be present in the real-world.

The control component 108 may be configured to control the presentation device 141 (e.g., via one or more audio output devices 150) to effectuate presentation of audio content and/or ambient sounds. By way of non-limiting illustration, control component 108 may be configured to control presentation device 141 to effectuate presentation of one or more of the first audio content, the second audio content, ambient sounds, user-specific audio content, and/or other audio content. The presentation of the first virtual object and the first audio content may cause the user to perceive the first audio content as being emitted from the first virtual object.

In some implementations, the control component 108 may be configured to detect presence of one or more beacons physical present within a real-world environment. In some implementations, the control component 108 may be configured to determine a real-world location of a beacon in the real-world environment. In some implementations, the detection of presence and/or determination of the real-world location may be determined from image information using one or more image-processing techniques. In some implementations, the control component 108 may be configured to control the presentation device 141 to generate an image of a virtual object such that the virtual object may be perceived to be present at the real-world location of the beacon.

The gaze component 110 may be configured to obtain gaze information and/or other information. In some implementations, gaze component 110 may be configured to determine the gaze information and/or other information. Gaze information may include one or more of a user's gaze direction, vergence distance, vergence angle, and/or other information. Gaze information may be determined over time. In some implementations, gaze information may be determined from one or more of output signals from one or more sensors of gaze tracking device 170, output signals from an orientation sensor of one or more sensors 160, and/or other information. The output signals from one or more sensors of gaze tracking device 170 may convey one or more of positions of one or more pupils of a user relative to a locus of a reflectance of light emitted by an emitter of gaze tracking device 170, and/or other information used to determine gaze information. In some implementations, gaze direction may be expressed as a vector within a three-dimensional coordinate system. In some implementations, vergence distance may be expressed as one or more of a coordinate within the three-dimensional coordinate system, a range from a user, and/or other information.

In some implementations, the gaze component 110 may be configured to detect presence of one or more users present within a real-world environment. In some implementations, gaze component 110 may be configured to identify one or more users detected as being present. In some implementations, the detection of presence and/or identification of one or more users may be determined from one or more of image information, biometric information, and/or other information. By way of non-limiting illustration, gaze component 110 may be configured to match pixels of an image with an image template stored by the biometric information to determine an identify of one or more users.

The modification component 112 may be configured to modify the presentation of the audio content and/or other content. The modification component 112 may be configured to modify the presentation of the audio content based on one or more of gaze information, perceived locations of virtual content, identified users, and/or other information. In some implementations, the modification component 112 may be configured to modify the presentation of the audio content based a gaze direction being directed toward, intersecting with, and/or otherwise coinciding with a perceived location of a virtual object. The gaze direction being directed toward, intersecting with, and/or otherwise coinciding with a perceived location of a virtual object may dictate that a user may currently be directing their attention at the virtual object. The virtual object at which attention may be directed may be referred to as a "target virtual object."

The modification component 112 may be configured to, responsive to the gaze direction of the user being toward the first location, modify the presentation of the first audio content, the second audio content, and/or other audio content. In some implementations, the modification may include one or more of decreasing a volume of the second audio content and/or other audio content, ceasing presentation of the second audio content and/or other audio content, increasing a volume of the first audio content, and/or other modifications. In some implementations, the modification may include fading in the first audio content (by volume) and fading out the second audio content and/or other audio content (by volume).

The modification component 112 may be configured to modify the presentation of the ambient sounds and/or other content. The modification component 112 may be configured to modify the presentation of the ambient sounds based on one or more of the gaze information, perceived locations of virtual content, and/or other information. In some implementations, the modification component 112 may be configured to modify the presentation of the ambient sounds responsive to determining a target virtual object.

The modification component 112 may be configured to, responsive to the gaze direction of the user being toward the first location, modify the presentation of the first audio content, the ambient sounds, and/or other audio content. In some implementations, the modification may include one or more of decreasing a volume of the ambient sounds, ceasing presentation of the ambient sounds, increasing a volume of the first audio content, and/or other modifications. In some implementations, the modification may include fading in the first audio content (by volume) and fading out the ambient sounds (by volume).

In some implementations, the modification component 122 may be configured to modify the presentation of the audio content, ambient sounds, and/or other content based a gaze direction being directed toward, intersecting with, and/or otherwise coinciding with a perceived location of a virtual object for predetermined period of time. By way of non-limiting illustration, the modification component 112 may be configured to, responsive to the gaze direction of the user being toward the first location over for the predetermined period of time, modify the presentation of the first audio content, the ambient sounds, and/or other audio content. In some implementations, the predetermined period of time may be a period of time in the range of one and ten seconds. In some implementations, the predetermined period of time may be a period of time in the range of one and eight seconds. In some implementations, the predetermined period of time may be a period of time in the range of one to ten seconds. In some implementations, the predetermined period of time may be a period of time in the range of one to five seconds. In some implementations, the predetermined period of time may be a period of time in the range of two to four seconds.

In some implementations, the modification component 112 may be configured to modify the presentation of the audio content based a gaze direction being directed toward, intersecting with, and/or otherwise coinciding with one or more users identified to be present in the real-world. The gaze direction being directed toward, intersecting with, and/or otherwise coinciding with an identified user may dictate that a viewing user may currently be directing their attention at the identified user. The identified user at which attention may be directed may be referred to as a "target user." In some implementations, the modification may include one or more of effectuating presentation of user-specific audio content associated with the identified user, decreasing volume of other audio content, ceasing presentation of other audio content, and/or other modifications. In some implementations, the modification component 122 may be configured to effectuate presentation of user-specific audio content associated with the identified user based a gaze direction being directed toward, intersecting with, and/or otherwise coinciding with the identified user for predetermined period of time. In some implementations, the predetermined period of time may be a period of time in the range of one and ten seconds. In some implementations, the predetermined period of time may be a period of time in the range of one and eight seconds. In some implementations, the predetermined period of time may be a period of time in the range of one and five seconds. In some implementations, the predetermined period of time may be a period of time in the range of two and four seconds. In some implementations, the modification component 122 may be configured to effectuate presentation of user-specific audio content associated with an identified user based gaze directions of multiple users being directed toward, intersecting with, and/or otherwise coinciding with the identified user. In some implementations, the multiple users may include at least two users. The presentation device 141 may communicate with other presentation devices of other users (not shown in FIG. 1).

Figure 3:
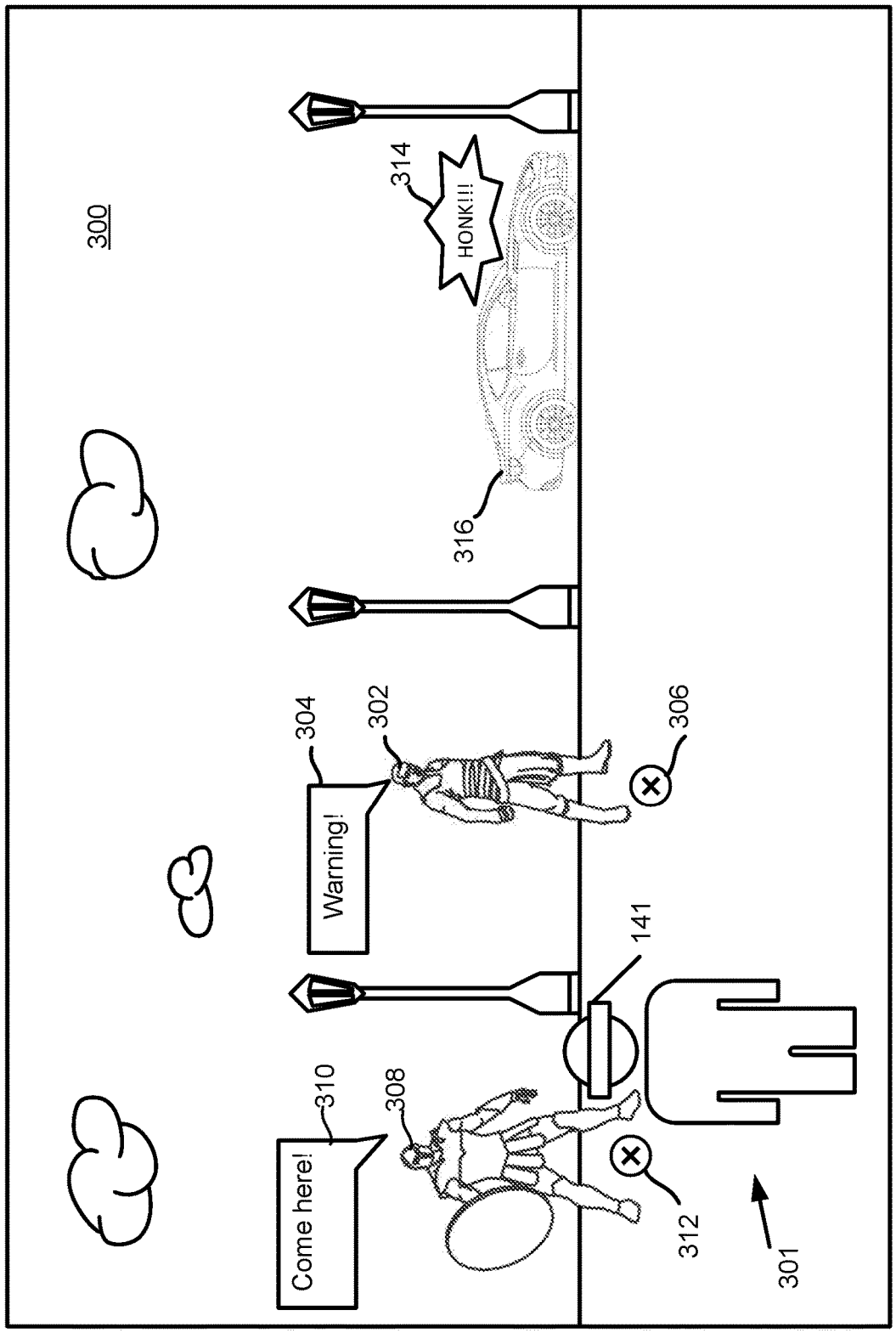
FIG. 3 illustrates a view of an interactive environment, in accordance with one or more implementations.

FIG. 3 illustrates a view of an interactive environment 300. The interactive environment 300 may include one or more of a user 301 in a real-world environment, presentation device 141 installed on the head of the user 301, one or more real-world objects, one or more virtual objects, presentation of audio content, presentation of ambient sounds, and/or other content and/or components. In some implementations, ambient sounds may be captured by an audio input sensor of presentation device 141 and presented via an audio output device of presentation device 141. The one or more real-world objects may include real-world object 316. The ambient sounds may include ambient sound 314. The ambient sound 314 may be produced by real-world object 316. The one or more virtual objects may include one or more of first virtual object 302, second virtual object 308, and/or other virtual objects. The audio content may include one or more of first audio content 304, second audio content 310, and/or other audio content. The first virtual object 302 may be perceived to be present at a first location. The first location may be associated with a location of a first beacon 306. The second virtual object 308 may be perceived to be present at a second location. The second location may be associated with a location of a second beacon 312.

In some implementations, the first audio content 304 may be perceived as being emitted from the first virtual object 302. In some implementations, the second audio content 310 may be perceived as being emitted from the second virtual object 308. However, in some implementations, the second audio content 310 may be different audio content that may or may not be associated with a given virtual object.

For illustrative purposes, the first audio content 304 is shown as an utterance of the word "Warning" and the second audio content 310 is shown as an utterance of the phrase "come here." It is further noted that the depiction of the speech bubbles including the words is for illustrative purposes only. In some implementations, audio content may not be graphically shown to user 301.

Figure 4:
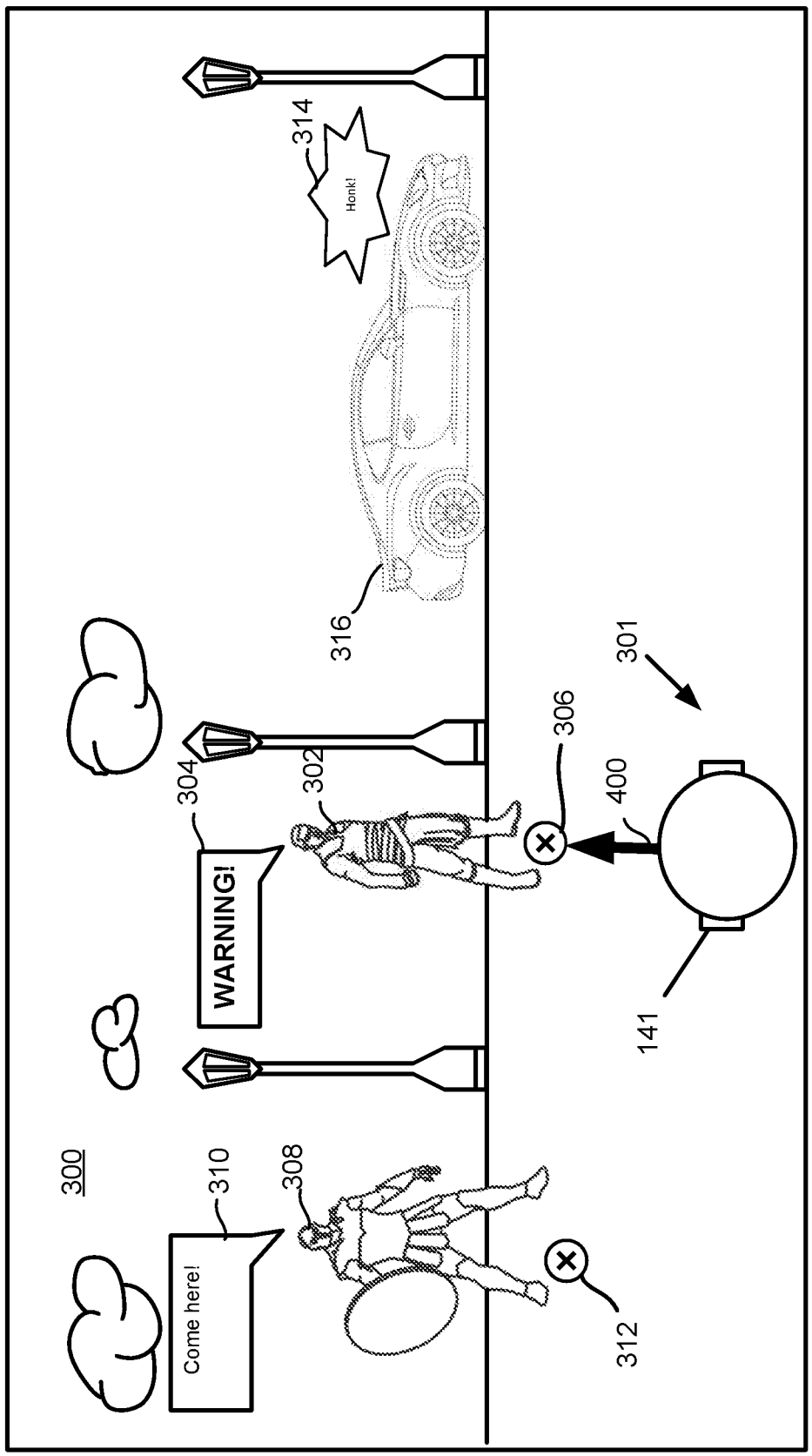
FIG. 4 illustrates a view of an interactive environment, in accordance with one or more implementations.

FIG. 4 illustrates another view of interactive environment 300 from the perspective of user 301. A gaze direction 400 of the user 301 may be determined. Responsive to the gaze direction 400 of the user 301 being toward the first location, presentation of one or more of the first audio content 304, the second audio content 310, ambient sound 314, and/or other audio content may be modified. In some implementations, the modification may include one or more of increasing a volume of first audio content 304, decreasing a volume of second audio content 310, ceasing presentation of second audio content 310, decreasing a volume of ambient sound 314, ceasing presentation of ambient sound 314, and/or other modifications.

Figure 5:
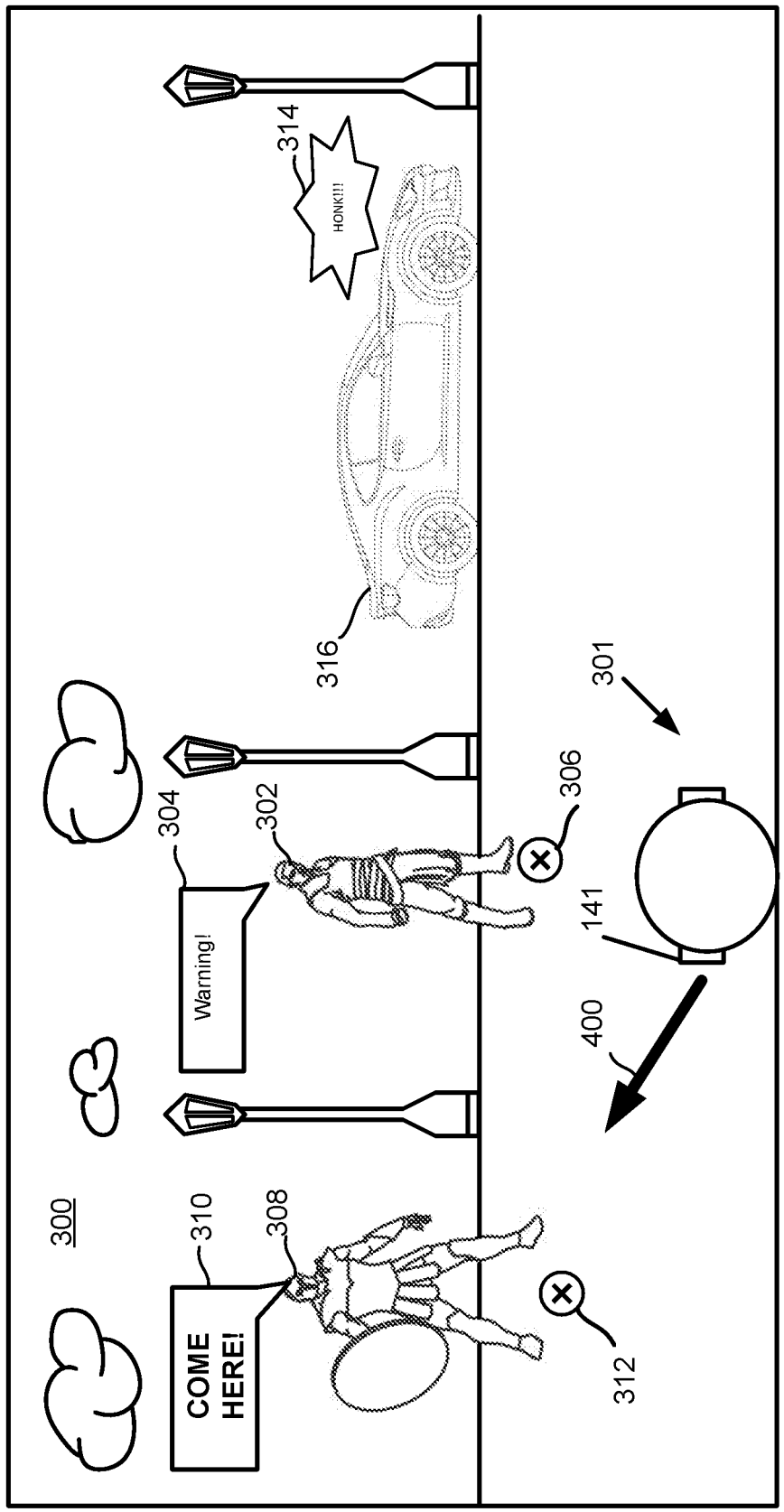
FIG. 5 illustrates a view of an interactive environment, in accordance with one or more implementations.

FIG. 5 illustrates another view of interactive environment 300 from the perspective of user 301. The gaze direction 400 of the user 301 may be determined. Responsive to the gaze direction 400 of the user 301 being toward the second location, presentation of one or more of the first audio content 304, the second audio content 310, ambient sound 314, and/or other audio content may be modified. In some implementations, the modification may include one or more of increasing a volume of second audio content 310, decreasing a volume of first audio content 304, ceasing presentation of first audio content 304, decreasing a volume of ambient sound 314, ceasing presentation of ambient sound 314, and/or other modifications.

Figure 6:
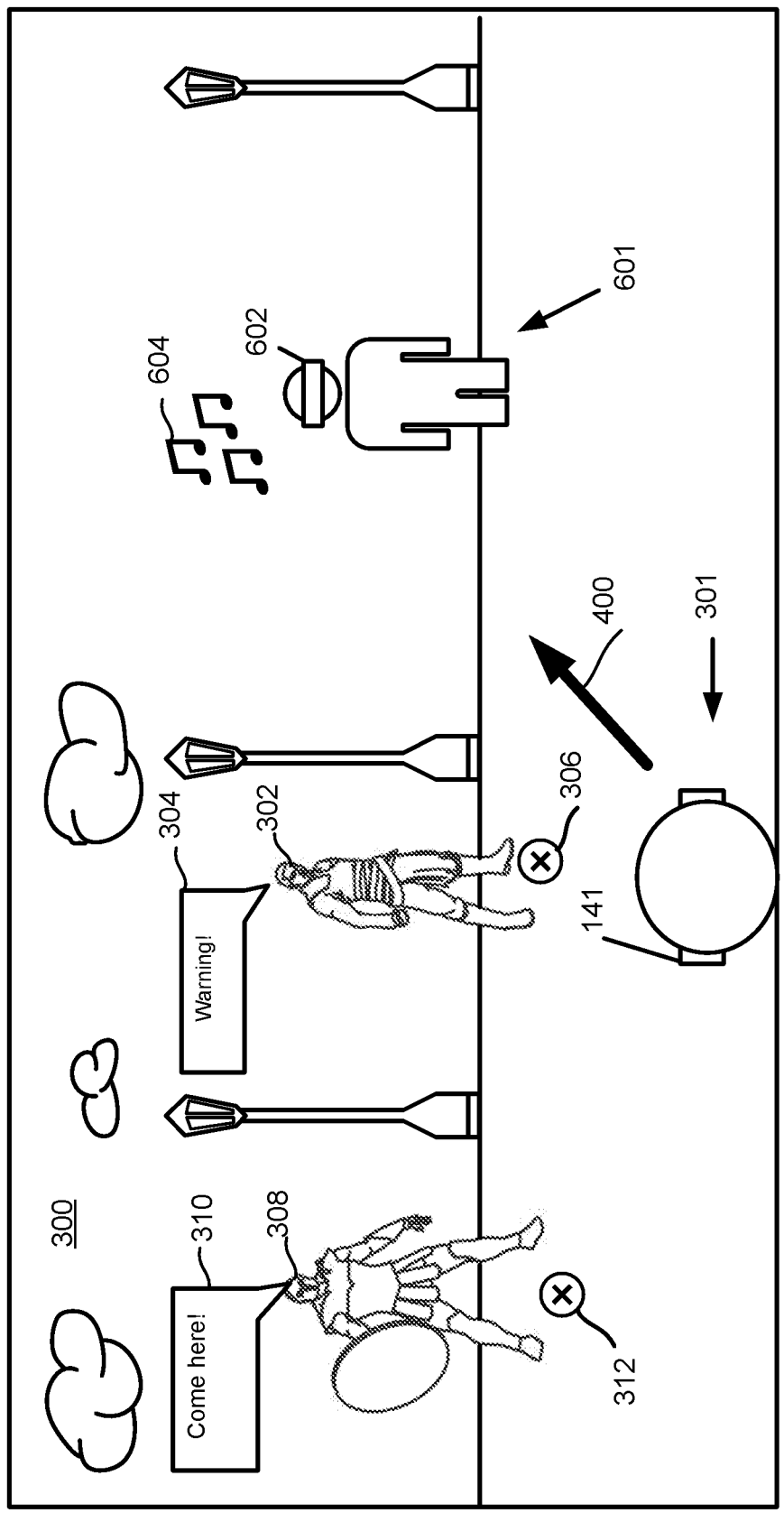
FIG. 6 illustrates a view of an interactive environment, in accordance with one or more implementations.

FIG. 6 illustrates another view of interactive environment 300 from the perspective of user 301. The interactive environment 300 may further include one or more of a second user 601, a second presentation device 602 installed on the head of the second user 601, other users, and/or other presentation devices. Presentation device 141 may detect presence and/or identify second user 601. Presentation device 141 may obtain user-specific audio content 604 (graphically shown as music notes for illustrative purposes) associated with second user 601. The gaze direction 400 of the user 301 may be determined. Responsive to the gaze direction 400 of the user 301 being toward the second user 601, presentation of audio content may be modified. In some implementations, the modification may include one or more of effectuating presentation of the user-specific audio content 604, decreasing a volume of first audio content 304, ceasing presentation of first audio content 304, decreasing a volume of second audio content 310, ceasing presentation of second audio content 310, decreasing a volume of ambient sound, ceasing presentation of ambient sound, and/or other modifications.

Returning to FIG. 1, in some implementations, external resource(s) 120 may include sources of information, hosts and/or providers of virtual content outside of system 100, external entities participating with system 100, one or more other presentation devices, and/or other resources. In some implementations, some or all of the functionality attributed herein to external resource(s) 120 may be provided by resources included in system 100. By way of non-limiting illustration, external resource(s) 120 may be configured to provide one or more of virtual content information, audio information, user information, and/or other information.

In some implementations, computing platform(s) 140 may include electronic storage(s) 122, processor(s) 124, and/or other components. Computing platform(s) 140 may include communication lines or ports to enable the exchange of information with a network and/or other computing devices. Illustration of computing platform(s) 140 in FIG. 1 is not intended to be limiting. Computing platform(s) 140 may include a plurality of hardware, software, and/or firmware components operating together to provide the functionality attributed herein to computing platform(s) 140. For example, computing platform(s) 140 may be implemented by a cloud of computing devices operating together as computing platform(s) 140.

In some implementations, electronic storage(s) 122 may include electronic storage media that electronically stores information. The electronic storage media of electronic storage(s) 122 may include one or both of system storage that is provided integrally (i.e., substantially nonremovable) with computing platform(s) 140 and/or removable storage that is removably connectable to computing platform(s) 140 via, for example, a port (e.g., a USB port, a firewire port, etc.) or a drive (e.g., a disk drive, etc.). Electronic storage(s) 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage(s) 122 may include one or more virtual storage resources (e.g., cloud storage, a virtual private network, and/or other virtual storage resources). Electronic storage(s) 122 may store software algorithms, information determined by processor(s) 124, information received from computing platform(s) 140, and/or other information that enables computing platform(s) 140 to function as described herein.

In some implementations, processor(s) 124 may be configured to provide information processing capabilities in computing platform(s) 140. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same computing platform, or processor(s) 124 may represent processing functionality of a plurality of devices operating in coordination. The processor (s) 124 may be configured to execute computer-readable instruction components 106, 108, 110, 112, and/or other components. The processor(s) 124 may be configured to execute components 106, 108, 110,112, and/or other components by software; hardware; firmware; some combination of software, hardware, and/or firmware; and/or other mechanisms for configuring processing capabilities on processor(s) 124.

It should be appreciated that although components 106, 108, 110, and 112 are illustrated in FIG. 1 as being co-located within a single processing unit, in implementations in which processor(s) 124 may include multiple processing units, one or more of components 106, 108, 110, and/or 112 may be located remotely from the other components. The description of the functionality provided by the different components 106, 108, 110, and/or 112 described herein is for illustrative purposes, and is not intended to be limiting, as any of components 106, 108, 110, and/or 112 may provide more or less functionality than is described. For example, one or more of components 106, 108, 110, and/or 112 may be eliminated, and some or all of its functionality may be provided by other ones of components 106, 108, 110, and/or 112. As another example, processor(s) 124 may be configured to execute one or more additional components that may perform some or all of the functionality attributed herein to one of components 106, 108, 110, and/or 112.

Figure 2:
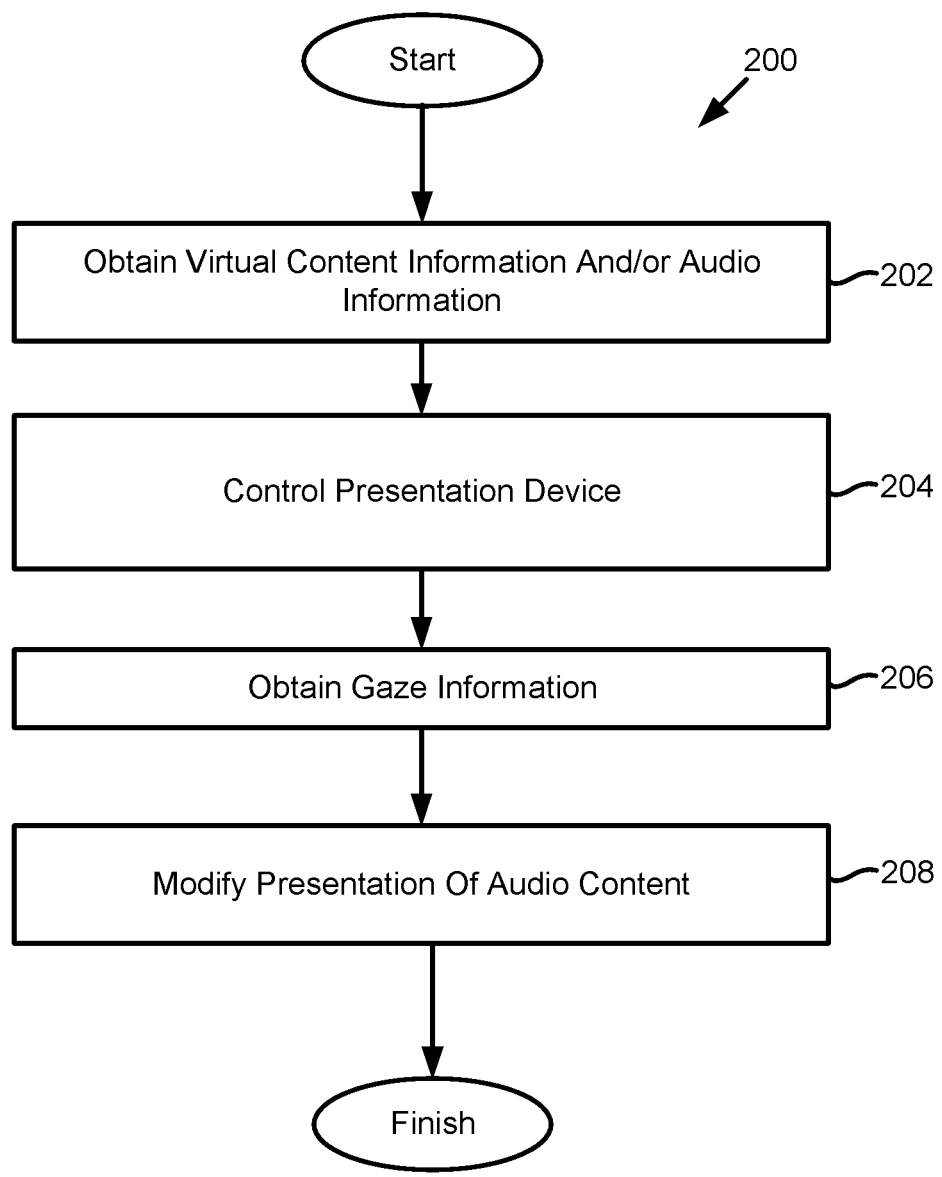
FIG. 2 illustrates a method to provide gaze-based audio presentation for interactive experiences, in accordance with one or more implementations.

FIG. 2 illustrates the method 200 to provide gaze-based audio, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below are not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200. In some implementations, method 200 may be implemented in a presentation device the same as or similar to presentation device 141 (shown in FIG. 1 and described herein).

At an operation 202, virtual content information, audio information, and/or other information may be obtained. The virtual content information may define virtual content. The virtual content may include one or more virtual objects. The one or more virtual objects may include a first virtual object and/or other virtual object. The audio information may define audio content. The audio content may include one or more of first audio content associated with the first virtual object, second audio content, and/or other audio content. In some implementations, operation 202 may be performed by a content component the same as or similar to content component 106 (shown in FIG. 1 and described herein).

At an operation 204, a presentation device may be controlled to effectuate presentation of images and/or audio content. The images may depict virtual objects. By way of non-limiting illustration, the presentation device may be controlled to generate a first image of the first virtual object such that the first virtual object may be perceived to be present at a first location in a real-world environment. The presentation device may be controlled to effectuate presentation of the first audio content, the second audio content, and/or other audio content. The presentation of the first virtual object and the first audio content may cause a user to perceive the first audio content as being emitted from the first virtual object. In some implementations, operation 204 is performed by the control component the same as or similar to control component 108 (shown in FIG. 1 and described herein).

At an operation 206, gaze information may be obtained. The gaze information may specify a gaze direction of the user and/or other information. In some implementations, operation 206 is performed by a gaze component the same as or similar to gaze component 110 (shown in FIG. 1 and described herein).

At an operation 208, the presentation of the audio content may be modified. The presentation of the audio content may be modified based on one or more of the gaze direction of the user, perceived locations of the one or more virtual objects, and/or other information. Responsive to the gaze direction of the user being toward the first location, the presentation of the first audio content, the second audio content, and/or other audio content may be modified. In some implementations, operation 208 is performed by a modification component the same as or similar to modification component 112 (shown in FIG. 1 and described herein).

Although the system(s) and/or method(s) of this disclosure have been described in detail for the purpose of illustration based on what is currently considered to be the most practical and/or preferred implementations, it is to be understood that such detail is solely for that purpose and/or that the disclosure is not limited to the disclosed implementations, but, on the contrary, is intended to cover modifications and/or equivalent arrangements that are within the spirit and/or scope of the appended claims. For example, it is to be understood that the present disclosure contemplates that, to the extent possible, one or more features of any implementation can be combined with one or more features of any other implementation.

What is claimed:

1. An augmented reality system configured to provide gaze-based audio presentation for users, the users including a user, a second user, and one or more other users, the system comprising:

non-transitory electronic storage storing virtual content information, audio information, and user audio information, the virtual content information defining virtual content, the virtual content including one or more virtual objects, the one or more virtual objects including a first virtual object, the audio information defining audio content associated with individual virtual objects, the audio content associated with the individual virtual objects including first audio content associated with the first virtual object, the user audio information defining user-specific audio content associated with individual users of the augmented reality system, the user-specific audio content including second audio content associated with the second user;

a presentation device configured to be worn by the user, the presentation device being configured to generate images of the virtual content and present the images such that the virtual content is perceived by the user as being present in a real-world environment, the presentation device further being configured to present the audio content; and one or more physical computer processors configured by machine-readable instructions to:
control the presentation device to generate a first image of the first virtual object such that the first virtual object is perceived to be present at a first location in the real-world environment;
detect presence of the individual users in the real-world environment and identify the individual users, such that the presence of the second user is detected, and the second user is identified;
obtain, from the non-transitory electronic storage, the user audio information defining the user-specific audio content associated with the individual users identified within the real-world environment, such that the user audio information defining the second audio content associated with the second user is obtained;
control the presentation device to effectuate presentation of the first audio content and the second audio content, wherein the presentation of the first virtual object and the first audio content causes the user to perceive the first audio content as being emitted from the first virtual object, and the presentation of the second audio content causes the user to perceive the second audio content as being emitted from the second user;
obtain gaze information, the gaze information specifying a gaze direction of the user;
modify the presentation of the audio content based on the gaze direction of the user, gaze directions of the one or more other users, individual locations of the individual users in the real-world environment, and perceived individual locations of the individual virtual objects, such that:
responsive to the gaze direction of the user being toward the first location, perform a first modification so that the first audio content is presented predominantly over the second audio content; and
responsive to the gaze direction of the user and the gaze directions of the one or more other users being toward a second location of the second user in the real-world environment, perform a second modification so that the second audio content is presented predominantly over the first audio content; and
wherein the gaze direction of the user and the gaze directions of the one or more other users being toward the second location of the second user in the real-world environment cause presentation devices of the one or more other users to also present the second audio content predominantly over other audio content.

2. The system of claim 1, wherein the first modification includes decreasing a volume of the second audio content, and the second modification includes decreasing a volume of the first audio content.

3. The system of claim 1, wherein the first modification includes ceasing presentation of the second audio content, and the second modification includes ceasing presentation of the first audio content.

4. The system of claim 1, wherein the first modification includes increasing a volume of the first audio content, and the second modification includes increasing a volume of the second audio content.

5. The system of claim 1, wherein:
the presentation device further includes one or more sensors configured to generate output signals conveying ambient audio information, the ambient audio information defining ambient sounds within the real-world environment; and
the one or more physical processors are further configured by the machine-readable instructions to:
control the presentation device to effectuate presentation of the ambient sounds;
modify the presentation of the ambient sounds based on the gaze direction of the user, the individual locations of the individual users in the real-world environment, and the perceived individual locations of the individual virtual objects, such that responsive to the gaze direction of the user being toward the first location, modify the presentation of the ambient sounds.

6. The system of claim 5, wherein modifying the presentation of the ambient sounds includes decreasing a volume of the ambient sounds or ceasing presentation of the ambient sounds.

7. The system of claim 1, wherein the presentation device includes a headset, a mobile computing platform configured to be removably attached to the headset, and one or more audio output devices.

8. The system of claim 1, wherein the one or more physical processors are further configured by the machine-readable instructions to:
detect presence of one or more beacons physical present within the real-world environment, the one or more beacons including a beacon;
determine a real-world location of the beacon in the real-world environment; and
control the presentation device to generate an image of a second virtual object such that the second virtual object is perceived to be present at the real-world location of the beacon.

9. The system of claim 8, wherein third audio content is associated with the second virtual object.

10. The system of claim 1, further comprising a gaze tracking device configured to generate output signals conveying the gaze information.

11. A method to provide gaze-based audio presentation for users of an augmented reality system, the users including a user, a second user, and one or more other users, the method comprising:
storing virtual content information, audio information, and user audio information, the virtual content information defining virtual content, the virtual content including one or more virtual objects, the one or more virtual objects including a first virtual object, the audio information defining audio content associated with individual virtual objects, the audio content associated with individual virtual objects including first audio content associated with the first virtual object, the user audio information defining user-specific audio content associated with individual users of the augmented reality system, the user-specific audio content including second audio content associated with the second user;
controlling a presentation device to generate a first image of the first virtual object such that the first virtual object is perceived to be present at a first location in a real-world environment;
detecting presence of the individual users in the real-world environment and identifying the individual users, including detecting presence of the second user and identifying the second user;

obtaining the user audio information defining the user-specific audio content associated with the individual users identified within the real-world environment, including obtaining the user audio information defining the second audio content associated with the second user;

controlling the presentation device to effectuate presentation of the first audio content and the second audio content, wherein the presentation of the first virtual object and the first audio content causes the user to perceive the first audio content as being emitted from the first virtual object, and the presentation of the second audio content causes the user to perceive the second audio content as being emitted from the second user;

obtaining gaze information, the gaze information specifying a gaze direction of the user;

modifying the presentation of the audio content based on the gaze direction of the user, gaze directions of one or more other users, individual locations of the individual users in the real-world environment, and perceived individual locations of the individual virtual objects, such that:

responsive to the gaze direction of the user being toward the first location, performing a first modification so that the first audio content is presented predominantly over the second audio content; and responsive to the gaze direction of the user and the gaze directions of the one or more other users being toward a second location of the second user in the real-world environment, performing a second modification so that the second audio content is presented predominantly over the first audio content; and wherein the gaze direction of the user and the gaze directions of the one or more other users being toward the second location of the second user in the real-world environment cause presentation devices of the one or more other users to also present the second audio content predominantly over other audio content.

12. The method of claim 11, wherein the first modification includes decreasing a volume of the second audio content, and the second modification includes decreasing a volume of the first audio content.

13. The method of claim 11, wherein the first modification includes ceasing presentation of the second audio content, and the second modification includes ceasing presentation of the first audio content.

14. The method of claim 11, wherein the first modification includes increasing a volume of the first audio content, and the second modification includes increasing a volume of the second audio content.

15. The method of claim 11, further comprising:

generating output signals conveying ambient audio information, the ambient audio information defining ambient sounds within the real-world environment; and controlling the presentation device to effectuate presentation of the ambient sounds; and modifying the presentation of the ambient sounds based on the gaze direction of the user, the individual locations of the individual users in the real-world environment, and the perceived individual locations of the individual virtual objects, including responsive to the gaze direction of the user being toward the first location, modifying the presentation of the ambient sounds.

16. The method of claim 15, wherein modifying the presentation of the ambient sounds includes decreasing a volume of the ambient sounds or ceasing presentation of the ambient sounds.

17. The method of claim 11, wherein the method is implemented in the presentation device, the presentation device including a headset, a mobile computing platform configured to be removably attached to the headset, and one or more audio output devices.

18. The method of claim 11, further comprising:

detecting presence of one or more beacons physical present within the real-world environment, the one or more beacons including a beacon;

determining a real-world location of the beacon in the real-world environment;

controlling the presentation device to generate an image of a second virtual object such that the second virtual object is perceived to be present at the real-world location of the beacon.

19. The method of claim 18, wherein third audio content is associated with the second virtual object.

20. The method of claim 11, further comprising generating output signals conveying the gaze information.

* * * * *